No. 749,659.                              PATENTED JAN. 12, 1904.
T. J. BROUGH.
WEIGHING AND PACKAGING MACHINE.
APPLICATION FILED MAY 29, 1903.
NO MODEL.                                        4 SHEETS—SHEET 1.

WITNESSES:
Jos. A. Ryan
Amos W. Hart

INVENTOR
Thomas J. Brough
BY Munn & Co.
ATTORNEYS.

No. 749,659. PATENTED JAN. 12, 1904.
T. J. BROUGH.
WEIGHING AND PACKAGING MACHINE.
APPLICATION FILED MAY 29, 1903.
NO MODEL. 4 SHEETS—SHEET 3.

WITNESSES:
Jos. A. Ryan
Amos W. Hart

INVENTOR
Thomas J. Brough
BY Munn & Co.
ATTORNEYS.

No. 749,659. PATENTED JAN. 12, 1904.
T. J. BROUGH.
WEIGHING AND PACKAGING MACHINE.
APPLICATION FILED MAY 29, 1903.
NO MODEL. 4 SHEETS—SHEET 4.
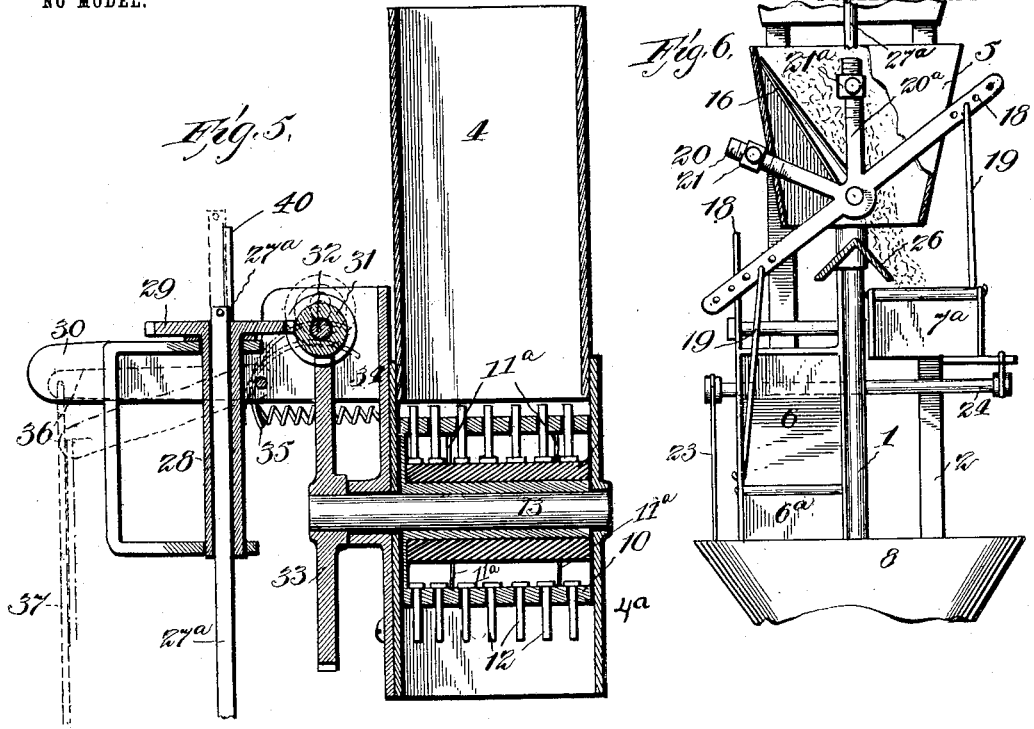
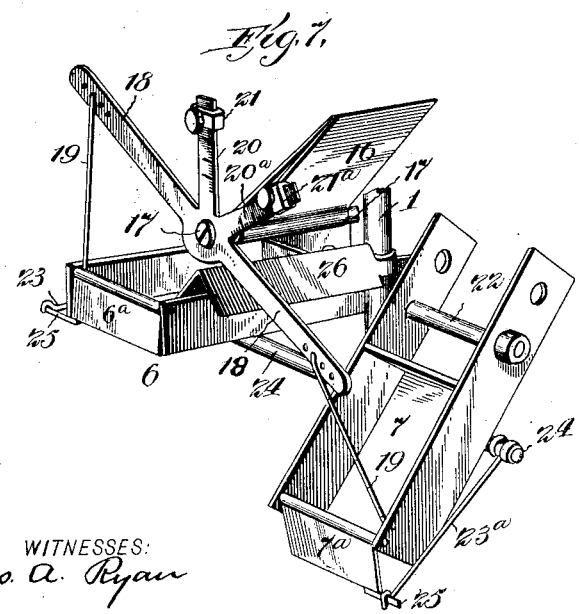
WITNESSES:
Jos. A. Ryan
Amos W Hart
INVENTOR
Thomas J. Brough
BY Munn & Co.
ATTORNEYS.

No. 749,659.

Patented January 12, 1904.

UNITED STATES PATENT OFFICE.

THOMAS J. BROUGH, OF BALTIMORE, MARYLAND.

WEIGHING AND PACKAGING MACHINE.

SPECIFICATION forming part of Letters Patent No. 749,659, dated January 12, 1904.

Application filed May 29, 1903. Serial No. 159,362. (No model.)

*To all whom it may concern:*

Be it known that I, THOMAS J. BROUGH, a citizen of the United States, residing at Baltimore, in the State of Maryland, have made certain new and useful Improvements in Weighing and Packaging Machines, of which the following is a specification.

My invention is an improved automatic machine adapted for measuring and weighing pulverulent substances or those of allied character, such as tea, coffee, spices, &c.

The details of construction, combination, and operation of parts are as hereinafter described, reference being had to accompanying drawings, in which—

Figure 1:
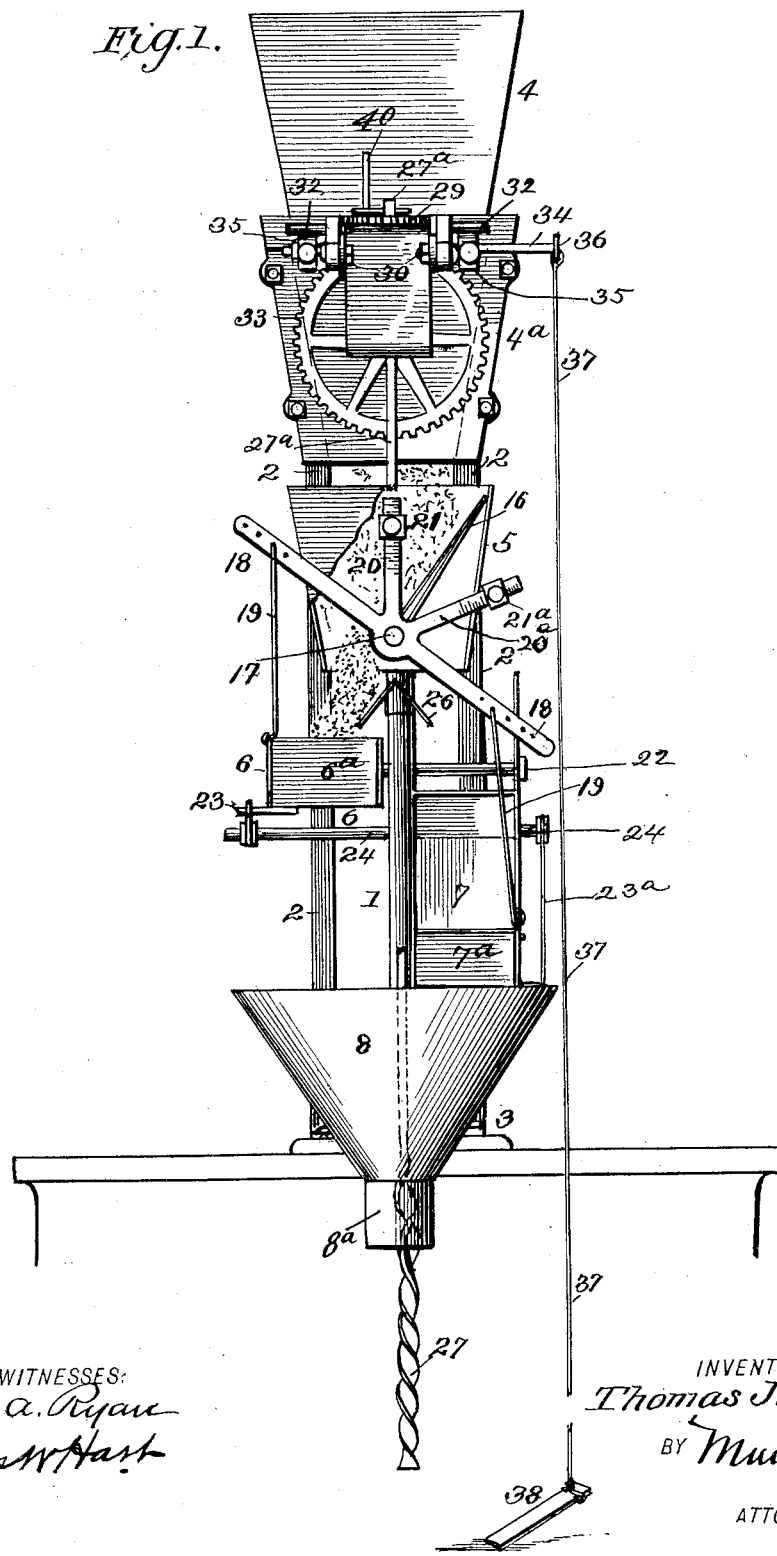
Figure 2:
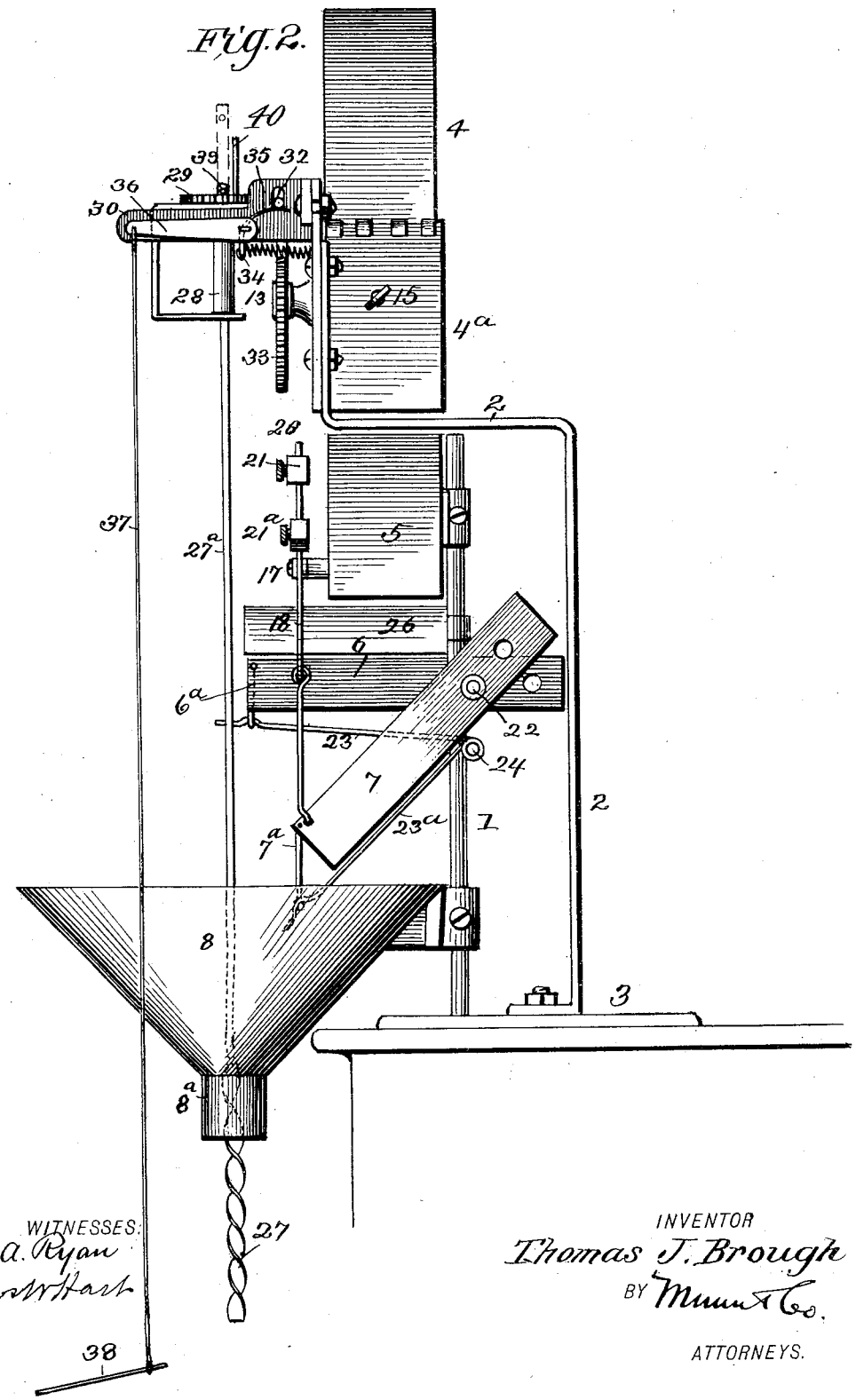
Figure 3:
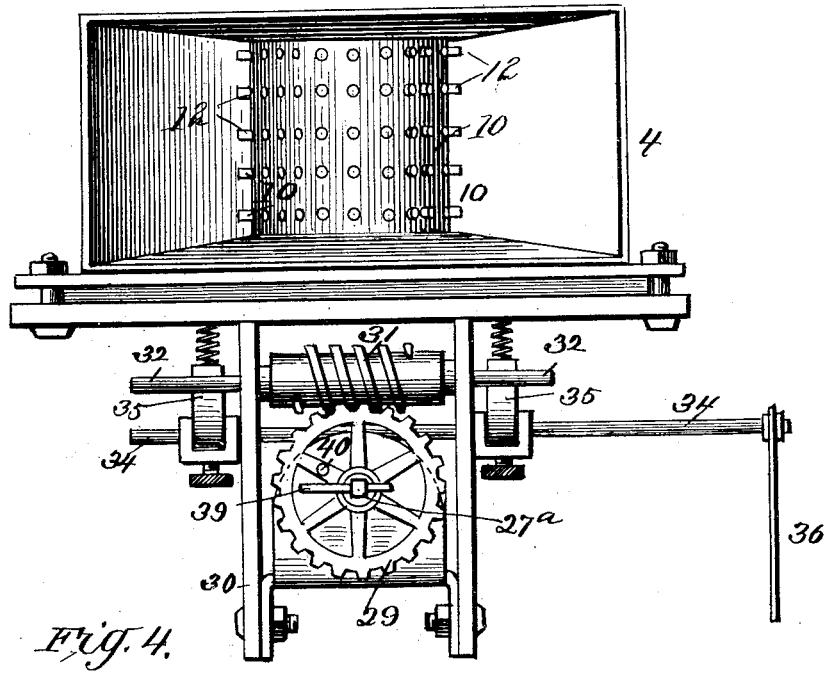
Figure 4:
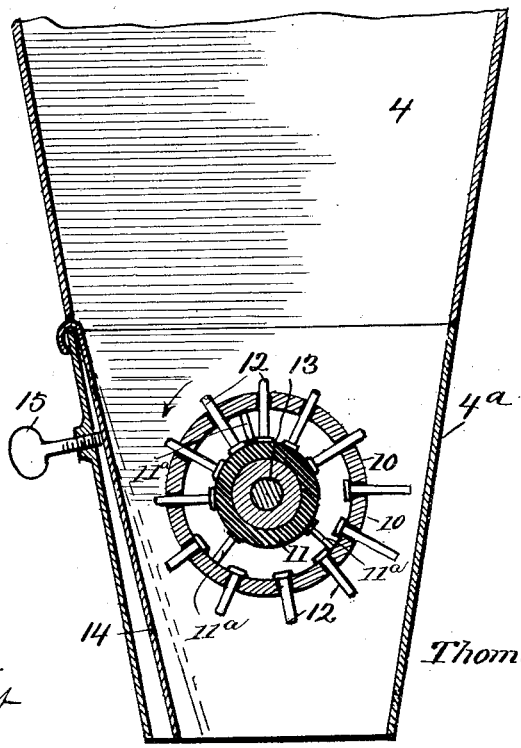

Figure 1 is mainly a front elevation of my improved machine, a portion being broken away for the sake of better illustration of certain parts. Fig. 2 is a side view of the machine. Fig. 3 is a top plan view of the machine. Fig. 4 is an enlarged vertical central section of the receiving-hopper. Fig. 5 is a vertical central section of the upper portion of the machine, the plane of section being parallel to the side shown in Fig. 2. Fig. 6 is mainly a face view of the central portion of the machine, a portion being in section for sake of better illustration. Fig. 7 is a perspective view of the weighing-pans and parts immediately connected therewith.

The parts composing the working apparatus or machine are suitably arranged in and supported by a vertical frame. In this instance the frame is shown composed of a vertical standard 1 (see Figs. 1 and 2) and two bent standards 2, which are attached to a suitable base 3, the latter being adapted to be secured to any fixed horizontal support. The material to be measured and weighed is delivered into a receiving-hopper 4, from which it is discharged into a lower guide-hopper 5, whence it is delivered into one or the other of two weighing-pans 6 and 7 and by them discharged into what may be termed the "delivery-hopper" 8. Within the lower portion $4^a$ of the receiving-hopper 4 (see Figs. 4 and 5) is arranged a rotary agitator 9, the same consisting of two concentric cylinders 10 and 11 and a series of radial pins or fingers 12, which are adapted to slide in guide-holes formed in the outer cylinder 10. The heads of said fingers rest upon the inner cylinder 11 during a portion of the rotation of the agitator; but the pins slide outward and project as far as their heads allow during the remainder of the rotation of the agitator, as will be understood by reference to Fig. 4. This automatic change of position of the fingers 12 is effected by gravity, they being adapted to slide easily in the guide-openings of the cylinder 10. By such arrangement and operation of the fingers 12 the material being measured and weighed is prevented from becoming packed between the fingers on the upper side of the outer cylinder 10, as it would tend to do if the fingers were fixed in position. In other words, the fingers are practically self-discharging and at the same time duly agitate and remove the material from the hopper. The inner cylinder 11 of the agitator is preferably constructed of hard rubber, and the two cylinders are held rigidly in concentric position with relation to each other and the shaft 13 by means of radial arms. In Fig. 5 the support is indicated by means of a sleeve fitting the shaft 13. The direction of rotation of the agitator is to the left, as indicated by arrow in Fig. 4. In order to regulate the amount of material discharged, I provide the left-hand side of the hopper-section $4^a$ with an adjustable plate or valve 14, which is hinged at its upper end and adapted to be placed at a greater or less vertical angle, as indicated by dotted lines. This adjustment may be effected by means of a set-screw 15, passing through the side of the hopper. The valve 14 will be adjusted at a greater or less angle—that is to say, nearer to or farther from the agitator—according to the kind or condition of the material being measured and weighed, some kinds of material requiring a larger opening between the agitator and side of the hopper, or, in other words, a freer discharge than others. The material being weighed or measured and delivered from the upper hopper 4 passes into the guide-hopper 5, where it is diverged laterally into one or the other of the oscillating weighing-pans 6 and 7. This diversion is effected by means of a plate or valve 16. (See Figs. 1, 6, and 7.) The said valve is fixed upon a transverse shaft 17, which is rocked or turned from right to left each time that a predetermined quantity is received into one of the weighing-pans, as will be understood by further description. On the outer end of the shaft 17 is mounted a four-armed lever, whose function is as follows: Two of the arms 18 are in alinement and project in opposite directions from the shaft 17. They are provided with a series of perforations for attachment of the rods 19, which support the two weighing-pans 6 and 7. The aforesaid lever is further provided with two radial arms 20 and $20^a$, which form an acute angle with each other and with the respective bars 18. The arms 20 and $20^a$ are graduated in fractions of an inch and carry slidable weights 21 and $21^a$. The weight 21 on the left-hand arm 20 serves as a counterbalance for the right-hand pan 7 and whatever amount of the material to be weighed that might be delivered into the same, and the weight $21^a$ of the right-hand arm $20^a$ serves a like purpose with relation to the left-hand pan 6. It is apparent that by adjustment of the weights 21 and $21^a$ nearer to or farther from the pivot 17 the amount and weight of the substance delivered into the pans may be varied as desired. In other words, if the weight 21 be adjusted out to the farthest limit allowed on the arm 20, it is obvious that a larger quantity and a greater weight of the material will be supported in the pan 7, and, conversely, that by adjustment of the said weight to its lowest limit on the arm 20 the smallest quantity and weight of material will be measured by the pan 7. The arrangement and operation of the weighing-pans are as follows: Each is practically an open box having three closed sides and a hinged and swinging front end or door. In the case of the pan 6 such end is indicated by $6^a$ and in the case of the pan 7 by $7^a$. Each of the pans is provided with rearward extensions or arms, by means of which it is pivoted upon a horizontal shaft or bar 22, forming a rigid attachment of the vertical post 1. The two pans 6 and 7 are arranged parallel and adapted to swing from a horizontal position to an angle of about forty-five degrees, as indicated best in Fig. 7. The swinging ends or doors $6^a$ and $7^a$ are connected by rods 23 and $23^a$, respectively, with a bar 24, which also forms a fixture of the aforesaid post 1. The rods 23 $23^a$ are provided at their front ends with hooks, which engage lateral projections 25 of the doors $6^a$ and $7^a$. By inspection of Fig. 7 it will be understood that when the pan 6 is in the horizontal position, as further indicated in Fig. 1, it is adapted to receive the material—say tea—which is being measured and weighed and that when such pan descends to the inclined position the door or end $6^a$ will be swung out, so as to permit discharge of the quantity of material previously deposited in the pan. In Figs. 1, 2, and 7 it will be seen that the four-armed lever is in such position that the left-hand pan 6 is horizontal and the right-hand pan is inclined, as required for discharging its contents. In Fig. 1 the material is shown discharging from the upper hopper 4 and $4^a$ into the guide-hopper 5 and is diverted to the left by the swinging valve or plate 16, which forms an attachment of the rocking shaft 17, whereon the four-armed lever is also fixed. So soon as the quantity of material required to overcome the counterbalancing-weight $21^a$ has been delivered into the pan 6 it will swing downward, and through the medium of the four-armed lever the right-hand pan 7 will at the same time be swung upward to the horizontal position. As the left-hand pan 6 thus descends its door $6^a$ will be opened by means of the rod 23, thus allowing discharge of its contents. When the right-hand pan 7 is swung up to the horizontal position, the valve or divider 16 will assume the position indicated in Fig. 6—that is to say, inclined to the left—so as to guide the material into the right-hand pan 7. Thus the four-armed lever and its rock-shaft, together with the divider 16 and the pans 6 and 7, operate automatically together and shift alternately from one position to the other so often as the due quantity and weight of the material is delivered into one pan or the other. When the weights 21 and $21^a$ are equal and adjusted at the same distance from the axis 17, it is apparent that equal quantities of material will be weighed by the two pans; but if one of the weights be made larger than the other, or if it be adjusted farther from the axis 17, then the opposite pan will weigh a greater quantity than the other, for the reason that a greater weight will be required to tilt the four-armed lever. Thus one pan may weigh a smaller quantity than the other. In other words, one may weigh two ounces of tea while the other receives and weighs three or four. Thus two sizes of packages may be filled alternately by the use of this machine.

For the purpose of guiding the material while descending from the hopper 5 into the respective pans 6 and 7 I provide an inverted-V-shaped deflector 26, (see especially Figs. 1 and 7,) the same being preferably formed of sheet metal and attached to the post 1 and arranged intermediately of and slightly above the pans 6 and 7. The latter discharge alternately into the delivery-hopper 8, which is attached to the post 1. The paper bag or other receptacle which may be used for the material being weighed is placed with its mouth over the nozzle $8^a$ of said funnel and also over the spirally-twisted end 27 of a rod $27^a$, that extends upward (see Figs. 2 and 5) through the center of the hopper and also through the elongated hub 28 of a worm-wheel 29. The latter is supported rotatably in brackets 30, forming an attachment of the front of the receiving-hopper 4. The worm-wheel 29 meshes with a worm 31, which is keyed upon a transverse driving-shaft 32. The latter is parallel to the face of the hopper and will in practice be driven by any suitable motor. Its worm 31 meshes with a large spur-gear 33, which is mounted on the agitator-shaft 13 and serves as a driver for the latter. Thus the worm-shaft 32 drives both wheels 29 and 33 and in consequence the two shafts 27$^a$ and 13 simultaneously. Provision is, however, made for raising the driving-shaft 32, so as to throw the worm 31 out of engagement with the large or vertical gear 33 without affecting its engagement with the horizontal gear 29 of shaft 27$^a$. For this purpose the driving-shaft 32 is journaled in vertical slots (see Fig. 2) in brackets 30. For raising the shaft when it is required to arrest the agitator 9, and thereby stop the feed of material from the hopper 4, I arrange a shaft 34 in brackets 30 parallel to and in front of the driving or worm shaft 32 and provide it with curved arms or tappets 35, that extend under said worm-shaft 32, and also with a lever-arm 36, from whose free end a cord 37 extends down to a treadle 38. It will be seen that in case the operator desires to arrest discharge of the material from hopper 4, and thus arrest also the weighing and measuring apparatus proper, he has only to depress the treadle 38, whereby the shaft 34 will be rocked and the curved arms 35 caused to raise the worm-shaft 32, as shown by dotted lines, Fig. 3, so that the worm 31 is thrown out of mesh with gear 33. Such arrest of operation of the weighing apparatus may be required, for example, when the operator fails to place or adjust an empty bag beneath the hopper 8 as quickly as required. The spiral end 27 of shaft 27$^a$ is to be so constructed as to work in the bag or other package and by its rotation pack the material therein with due compactness or solidity. The shaft is adapted to slide vertically in the elongated hub 28, and it will do this as fast as the material packs and rises in the bag held over the spiral end 27 of the shaft or rod. The shaft 27$^a$ is adapted to rotate in the hub 28 of the gear 29, but is compelled to rotate with the latter by reason of the provision of a cross-pin 39, (see Figs. 1 and 4,) which pin engages a vertical stud 40, with which the wheel 29 is provided. By this combination of parts the shaft rotates with the wheel 29 until the cross-pin 39 rides over the top of the stud 40, which is sufficient to insure due packing of the material in the bag. Thus the shaft 27$^a$ ceases to rotate by automatic disconnection with the gear 29. It is to be understood that the spiral portion 27 of the shaft is to be made in such manner as not to tear or injure the bag.

It is to be understood that various forms of toothed agitator may be used in place of that shown for aiding in discharge of material from the hopper 4$^a$.

Having thus described my invention, what I claim as new, and desire to secure by Letters Patent, is—

1. In a machine of the character described, the combination, with a receiving-hopper, of a rotary agitator comprising an outer perforated cylinder and an inner hub or cylinder, arranged concentrically with the outer one, and a series of pins adapted to slide in the outer cylinder and provided with heads for arresting them in their outward movement, the said pins being independent of each other and the inner cylinder, and sliding radially by the effect of gravity alone, substantially as described.

2. The combination, with the frame and the hopper, of a horizontal rock-shaft and valve fixed thereto and arranged centrally in the lower portion of the hopper, a lever fixed on the outer end of the rock-shaft and extending therefrom in opposite directions, two weighing-pans pivoted at their rear ends to the frame and thus adapted to swing on such fixed points, and rods connecting their free front ends with the ends of said lever, as described.

3. The combination with a hopper, a deflecting-valve therein, a rock-shaft upon which the valve is mounted, a lever connected with the rock-shaft, a weighing-pan pivoted below the hopper, and also connected with the aforesaid lever, the pan being provided with a swinging end, and a rod attached to a fixed portion of the frame of the machine and connected with the swinging end of the pan so that when the latter descends upon having received a certain quantity of the material to be weighed, the said end is swung outward automatically to allow discharge of the material, substantially as shown and described.

4. The combination with a hopper, of two oscillating weighing-pans arranged below the same and provided with swinging outer ends, a rocking lever provided with two graduated arms extending at an angle to each other in a vertical plane and provided with independently-adjustable weights, rods connecting the pans with the said levers and other rods fixed to the frame of the machine and connected with the swinging ends of the pans as shown and described.

5. The combination with a receiving-hopper, a rotary agitator therein, a guide-hopper arranged below the receiving-hopper, an attachment of the guide-hopper adapted for deflecting the material to be weighed alternately to the right and left, oscillating weighing-pans into which the material is received from the guide-hopper, and a delivery-hopper into which the pans discharge, substantially as shown and described.

6. The combination with a receiving-hopper and a rotary agitator therein, and oscillating weighing-pans, of a hopper arranged below the same, and a packaging mechanism comprising a rotary shaft provided with a spiral at its lower end which projects below the said hopper, and means which operatively connects the shaft with the agitator so that they rotate together, substantially as shown and described.

7. The combination with a receiving-hopper and an agitator therein, of a delivery-hopper and a packaging mechanism comprising a shaft passing through the lower hopper, and having a spiral projecting below the same, the rotatable gear through which the shaft passes, a gear mounted on the shaft of the agitator and a driving-shaft having a gear which meshes with both the aforesaid gears whereby rotation is simultaneously imparted to the agitator and the spiral packer, substantially as shown and described.

8. The combination with a receiving-hopper, a rotary agitator therein, and a gear fixed exteriorly on the shaft thereof, a delivery-hopper and a vertical shaft passing through the same and having a spiral portion below the hopper, a horizontal gear through which the shaft is adapted to slide vertically, a horizontal driving-shaft having a gear adapted to mesh with both the aforesaid gears, the said shaft being movable bodily vertically, and means for raising the said shaft for throwing its gear out of engagement with the gear of the agitator while remaining operatively connected with the gear of the spiral shaft, substantially as shown and described.

9. The combination with a receiving-hopper, and a rotary agitator therein, of a gear fixed exteriorly on the shaft of the latter, a horizontal gear arranged contiguous to the first-named one, a driving-shaft having a gear which engages both the first-named ones and is adapted to move bodily vertically, a counter-shaft arranged parallel to the driving-shaft and adapted to rock and provided with arms adapted to engage the driving-shaft for raising it when the counter-shaft is rocked, a treadle attachment connected with the counter-shaft, and a vertical shaft connected with the aforesaid horizontal gear and provided with a spiral at its lower end for packing the material in bags or other receptacles, substantially as shown and described.

10. The combination with a hopper and means for discharging material therefrom, of a packaging mechanism comprising a vertically-slidable rod having a lower end provided with a spiral, a horizontal gear through which the shaft is adapted to slide, the said gear having a vertical stud and the shaft having a cross-pin adapted to engage the same, and means for driving such horizontal shaft, whereby the spiral shaft is rotated and rises simultaneously until freed from engagement with the aforesaid gear, substantially as shown and described.

11. The combination with a hopper and a discharger rotating therein and provided exteriorly with a worm-wheel arranged vertically, of a horizontal worm-wheel arranged contiguously to the first-named one, a driving-shaft arranged horizontally and provided with a worm which engages both the aforesaid wheels, the shaft being adjustable bodily vertically, a packaging-shaft having a spiral at its lower end and adapted to slide vertically in the horizontal worm-wheel and to be automatically disengaged therefrom and thus left motionless when the shaft has risen a certain height, a counter-shaft arranged contiguous to the driving-shaft and having arms adapted to engage the latter, a lever-arm applied to such counter-shaft, and a treadle connected with such lever-arm whereby upon depressing the treadle the counter-shaft is rocked and the driving-shaft disengaged from the agitator in the hopper in the manner described.

THOMAS J. BROUGH.

Witnesses:
SOLON C. KEMON,
AMOS W. HART.